(No Model.)
C. W. HUNT.
CONVEYER.
No. 466,040. Patented Dec. 29, 1891.
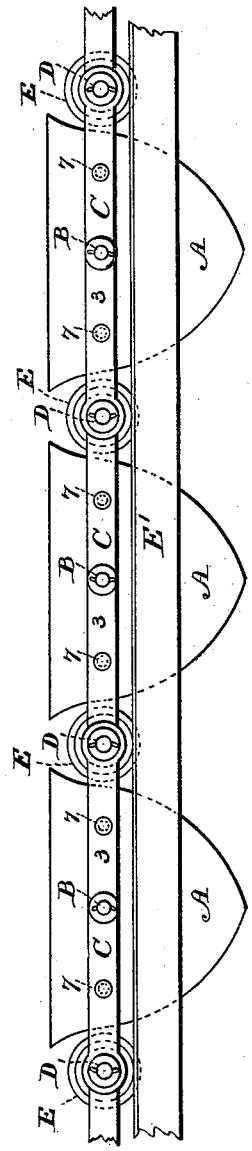
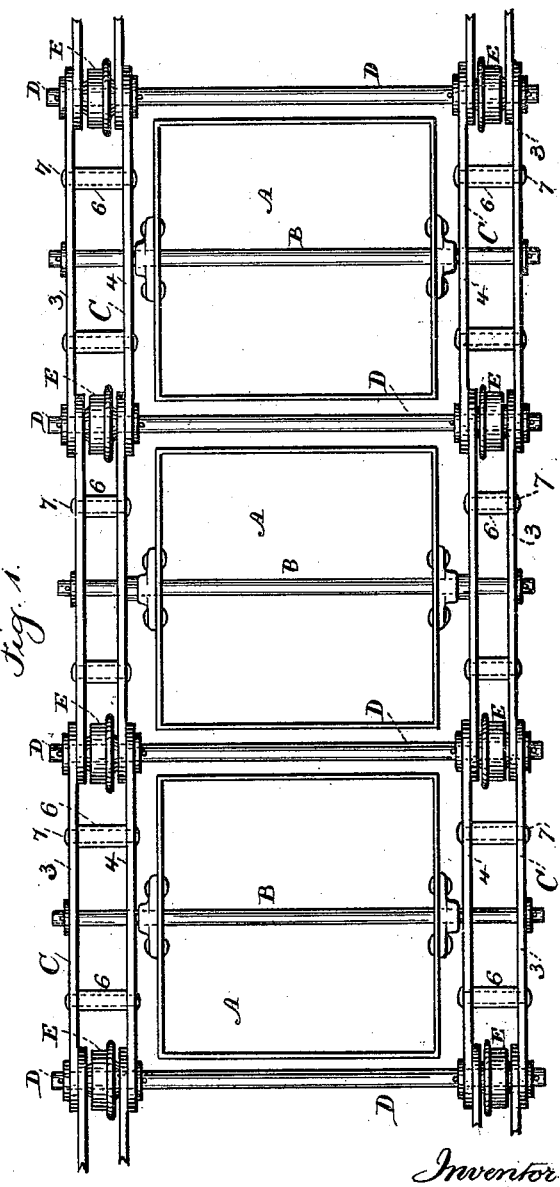
Witnesses
Chas H Smith
J Stait
Inventor
Charles W. Hunt
per Lemuel W. Serrell
atty

UNITED STATES PATENT OFFICE.

CHARLES W. HUNT, OF WEST NEW BRIGHTON, NEW YORK.

CONVEYER.

SPECIFICATION forming part of Letters Patent No. 466,040, dated December 29, 1891.

Application filed June 5, 1891. Serial No. 395,197. (No model.)

*To all whom it may concern:*

Be it known that I, CHARLES W. HUNT, a citizen of the United States, residing at West New Brighton, in the county of Richmond and State of New York, have invented an Improvement in Conveyers for Coal and other Substances, of which the following is a specification.

Conveyers for coal and other substances have been made with buckets pivoted to endless chains having rollers running upon tracks, and such chains carry the buckets up inclined tracks and along to the place of delivery. In some instances the pivot-pins have also formed the axles of the rollers or wheels; but the weight has tended to bend these axles, especially at the upper portions of the inclined tracks, because the weight of the buckets that are being raised rests principally upon the wheels and axles as they turn the vertical curve previous to passing upon the horizontal track. In my present improvements the chains are made double to form bearings at each axle and at each side of each wheel, so that the axles are relieved from the leverage or bending strain and can be made much lighter and stronger than those heretofore constructed.

In the drawings, Figure 1 is a plan view illustrating my said improvements, and Fig. 2 is an elevation of a portion of the conveyer with my improvements applied thereto.

I have represented in the drawings the buckets A as similar in shape to those in Letters Patent No. 331,961, to W. Griesser, dated December 8, 1885; but the buckets may be of any desired size or shape, and these buckets are pivoted at B; and the chains C are each made of two ranges of links 3 and 4, and the cross-shafts D pass through the links, near their ends, and form the pivots for such links, and these cross-shafts also form the axles for the wheels or rollers E, which are mounted upon said axles between the ranges of links 3 and 4, so that such links form the bearings for the axles at each side of each wheel, and there is little or no bending strain or leverage upon such axles, and the tension or strain which comes upon the links of the chain acts with a shearing strain upon the axles, and said axles can hence be much smaller than heretofore usual; and it will be noticed that wheels E run on the tracks E' and that the axles D pass across from one chain to the other and between one bucket and the next; and there are suitable collars, nuts, washers, or pins through the axles and at opposite sides of the respective chains to hold the parts in their proper relative positions, and in order to strengthen the chains and retain the respective links in their proper relative positions such links may be connected up in pairs by studs or by the tubular washers 6 and rivets 7. It will be observed that the pivots for the bucket A are in the center, or nearly so, of each pair of links, and by passing the pivot-rods across the buckets, as represented, the buckets are free to swing upon such pivot-rods; but in cases where it is desired to leave the top of the bucket entirely open the pivots can be fastened at the opposite sides of the bucket instead of the pivot-rod passing entirely across.

In my application, Serial No. 395,196, filed June 5, 1891, the links are shorter, so as only to extend from the cross-axles to the pivots, and supporting-rolls are provided upon axles in line with the pivots, the claims being limited to these features.

I claim as my invention—

1. The combination, with the hollow conveyer-buckets pivoted so as to hang by gravity, of supporting axles, wheels, and tracks, and two connecting-chains, one at each side of the range of buckets, the links of said chains connecting the axles and having bearings at both sides of each wheel, the pivots of the buckets bearing upon the links, substantially as set forth.

2. The range of hollow conveyer-buckets and the pivots on which they hang by gravity, in combination with the supporting wheels and tracks at each side of the buckets, the wheel-axles extending across between the buckets, and chain-links connecting the axles and having bearings at each side of each wheel and the pivotal bearings of the buckets resting upon such links, substantially as set forth.

3. The conveyer-buckets, supporting wheels, axles, and tracks, in combination with links connecting the respective axles and having bearings at each side of each wheel, and pivots for the buckets connected with the links and between one axle and the next, substantially as specified.

4. The combination, with the conveyer-buckets and their supporting wheels and axles, of links connecting the respective axles and having bearings at both sides of each wheel, said axles being between the buckets, and a pivot-rod across each bucket and through the links, substantially as specified.

5. The combination, with the conveyer-buckets and tracks at each side of the buckets, of two chains above the tracks, each having rigid links connected together in pairs and forming bearings at each side of each wheel, axles extending across between the buckets, and the pivots of the buckets resting upon the links of the chain, substantially as set forth.

6. The combination, with the conveyer-buckets and their supporting pivots, wheels, and axles, of two chains, each chain having links connecting the respective axles and pivots and having bearings at both sides of each wheel, substantially as set forth.

Signed by me this 2d day of June, 1891.

CHAS. W. HUNT.

Witnesses:
GEO. T. PINCKNEY,
WILLIAM G. MOTT.